Aug. 28, 1956     C. A. TUDBURY     2,761,048
HIGH-FREQUENCY INDUCTOR
Filed June 25, 1953
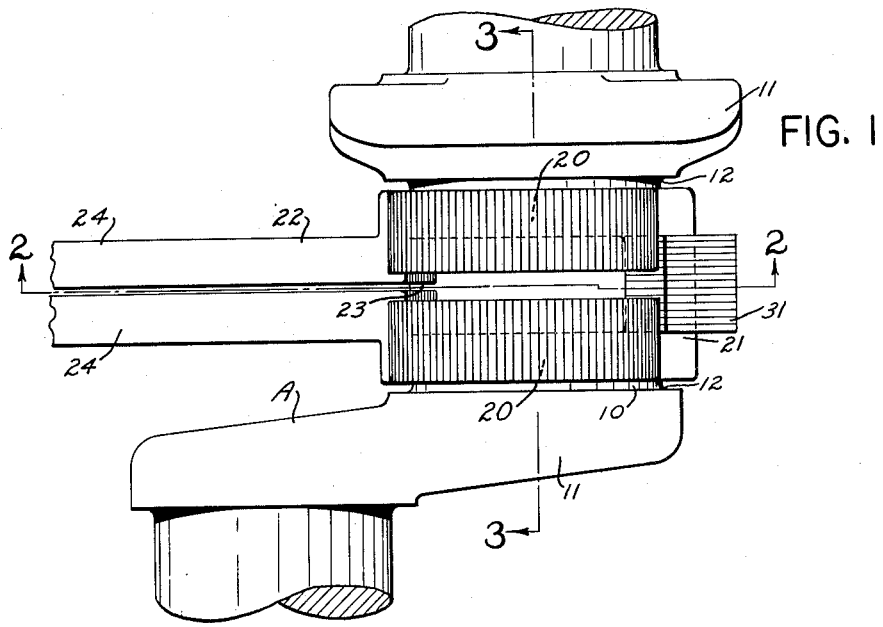
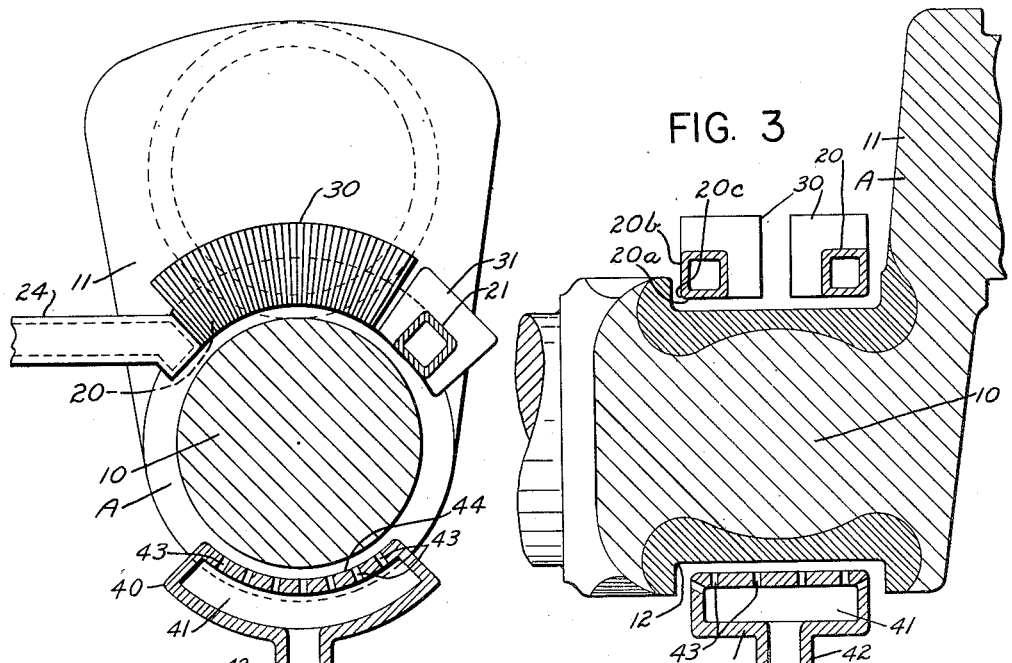
INVENTOR.
CHESTER A. TUDBURY
BY
*Alfred C. Body*
ATTY.

United States Patent Office 2,761,048
Patented Aug. 28, 1956

2,761,048

HIGH-FREQUENCY INDUCTOR

Chester A. Tudbury, Cleveland, Ohio, assignor to The Ohio Crankshaft Company, Cleveland, Ohio, a corporation of Ohio Application June 25, 1953, Serial No. 364,129

5 Claims. (Cl. 219—10.43)

This invention pertains to the art of high-frequency induction heating and, more particularly, to a high-frequency inductor and method of use for heating to above the quench-hardening temperature desired portions of crankshafts.

Crankshafts of the type to which this invention pertains normally include a plurality of cylindrical bearing surfaces, all having parallel axes and offset, one from the other, about a common axis of rotation, and integrally joined by large trans-axially extending webs or cheeks. The forces exerted on a modern crankshaft are very large and these forces impose very large stresses in the crankshaft, many of which are particularly concentrated at the juncture of the bearing surfaces and the web surfaces. Normally, to reduce this stress concentration, a smooth radius is provided between these two surfaces which is called a fillet. Notwithstanding the use of a fillet, the stress concentration still remains very high and the fillet is one of the weak points of a crankshaft.

Every effort is made to prevent any irregularity of discontinuity in the crankshaft in the region of the fillet which might further tend to concentrate the very high stresses already present at this point. One possible discontinuity which has given trouble in the past is the abrupt transition from a hardened zone of the crankshaft to a nonhardened zone such as is characteristic of high-frequency induction hardened bearing surfaces wherein the heating is so rapid that only the metal areas immediately adjacent the high-frequency inductor are raised to the quench-hardening temperature. When these heated areas are quenched, a very sharp line of demarcation ordinarily exists between the hardened area and the unhardened area.

In the past, it has been conventional to limit the induction hardened area of a crankshaft to the bearing surfaces alone and to keep this hardened area out of the fillets. Thus, the hardening served one purpose only; that is, to prevent undue or excess wear on the bearing surface when the crankshaft was in use.

As internal-combustion engines have been more and more improved, greater and greater forces have been imposed on the same sized crankshaft, thus requiring stronger and stronger crankshafts. However, because these greater forces were imposed by the same sized engine, it was impossible to strengthen the crankshaft up by increasing its size. Thus, the need for greater strength in the crankshaft without increasing its size became imperative and this need for greater strength came particularly in the weak spot; namely, the fillet.

It has been determined that if the hardened area could be made to extend all the way through the fillet and into the cheeks, a material increase in the strength of this weak spot could be obtained. The problem of obtaining this hardening, however, has proven to be a very substantial obstacle.

Conventional hardening techniques proved quite impractical. Thus, conventional inductors of the single or multiple-turn type which surround the bearing surfaces proved of no avail particularly in production, even though the inductors were carefully shaped to provide a greater concentration of heating in the vicinity of the fillets. These inductors would heat into but not through the fillet. This may, in part, be explained by the fact that the currents induced by the inductor always tends to take the shortest path which is in the bearing surface and not in the longer path radially outwardly of the bearing surface and in the cheek.

The present invention contemplates a high-frequency inductor which overcomes all of the objections of the prior art and enables the ready heating into and through the fillets of a crankshaft to a temperature above the critical hardening temperature which is relatively simple in construction and which is noncritical in use.

In accordance with the present invention, there is provided a high-frequency inductor including a pair of parallel extending arcuate conductors, each disposed in close-spaced relationship with the fillets of a crankshaft, the currents in these conductors at any one instant flowing in opposite directions, together with an end conductor interconnecting these two arcuate conductors extending in close-spaced relationship to the portions of the journal intermediate and between the fillets. The crankshaft disposed adjacent to this inductor is mounted for rotation relative to the inductor about the axis of the journal being heat treated and is rotated during the heating operation until the fillets and the bearing surface have all become heated to a temperature above the critical temperature of the steel. The crankshaft is then vigorously quenched to harden both the fillets and the bearing surface.

The principal object of the invention is the provision of a new and improved high-frequency inductor arrangement for hardening the fillets and the bearing surfaces of crankshafts.

Another object of the invention is the provision of a new and improved method for hardening the fillets of crankshafts which comprises disposing arcuate parallel-extending conductors, each with current flowing in opposite directions at any one instant, in close-spaced relationship with the fillets to be hardened and rotating the crankshaft relative to the inductor until the fillets have become heated to above the critical quench-hardening temperature for the particular steel employed.

Other objects will appear upon a reading and understanding of a preferred embodiment of the invention which will be described in detail in this specification and illustrated in the accompanying drawings which are a part hereof, and wherein:

Figure 1 is a top elevational view of one journal or bearing and the adjacent cheeks of a crankshaft in operative relationship with a high-frequency inductor constructed in accordance with the present invention;

Figure 2 is a cross-sectional view of Figure 1 taken approximately on the line 2—2 thereof; and Figure 3 is a cross-sectional view of Figure 1 taken approximately on the line 3—3 thereof and showing the ultimate desired hardened pattern of the crankshaft journal and fillets.

Referring now to the drawings wherein the showings are for the purposes of illustrating the invention and not for the purposes of limiting same, the crankshaft A, only fragments of which are shown, includes generally a cylindrical bearing surface 10 to be hardened intermediate conventional cheeks 11, which cheeks blend into the bearing surface 10 through rounded fillets 12, one of which, as shown, will be at each end of the bearing surface 10.

The crankshaft A may be of any known or desired steel and the material from which it is made forms no part of the present invention. Suffice it to say that the crankshaft should have a high enough carbon content to enable it to be hardened by high-frequency induction heating and quenching processes and such other alloys as will enable the crankshaft to stand up in the severe usage to which it will be subjected. Normally, crankshafts have about .45% carbon therein, and/or plus other alloying ingredients. The alloy of the crankshaft forms no part of the present invention.

The crankshaft A shown is mounted by any suitable and known means not shown for rotation about the central axis of the bearing surface 10 and suitable power means for rotating the crankshaft at a predetermined speed; which, in accordance with preferred embodiments of the invention, is in the neighborhood of 200 revolutions per minute, may be provided. Obviously, as will appear, other speeds differing radically therefrom may be employed.

The high-frequency inductor employed for hardening the bearing surfaces 10 is in top elevational view generally in the shape of a rectangle and is comprised of a pair of parallel-extending side conductors 20 and an end conductor 21 electrically interconnecting one end, the right-hand end as viewed in Figure 1, together. The opposite end conductor 22 is divided at the middle as at 23 and a pair of long fish-tail leads 24 each connect to one side of the split 23. These leads 24 extend away from the inductor in close-spaced parallel relationship for a substantial distance and, at their opposite ends, are connected to the terminal plates of an impedance-matching transformer not shown, which terminal plates also provide the mounting means for the inductor relative to the crankshaft A.

The conductors 20, 21, 22 and fish-tail leads 24 are all of hollow construction having continuous passages therethrough through which cooling water can be continuously circulated to remove heat generated in the conductors by the flow of electric currents therethrough or which may be absorbed by the conductors as radiated heat from the heated surfaces of the crankshaft. The plumbing connections to the fish-tail leads are conventional and are not shown.

The conductors are formed of pure high-conductivity copper and may be machined from solid copper blocks or by fabricating hollow copper tubing to the shapes shown.

The side conductors 20 are each generally identically constructed and similar in shape and the description of one will suffice for both. Each side conductor is generally rectangular in cross section and is arcuately curved to conform to the shape of the curvature of the bearing surface 10 substantially as shown in Figure 2. Each conductor thus has an inwardly-facing arcuate workpiece-facing surface 20a which is in relatively close-spaced relationship to this bearing surface 10 and a sidewardly-facing workpiece-facing surface 20b which is in close-spaced parallel relationship to the sides of the cheeks radially outwardly of the fillets 12 to be hardened. Obviously, the intersection of the two surfaces 20a and 20b faces the fillet 12 and this intersection is shown as being beveled as at 20c. The other two sides of the conductors 20 are provided with a stack of L-shaped magnetic laminations 30, the stack having a surface 30a forming an extension of the surface 20a and a surface 30b forming an extension of the surface 20b.

As shown, the two conductors 20 are spaced apart substantially so as to be in close proximity to the respective fillets 12 to be hardened.

The end conductor 21 has a similar cross section to that of the side conductors 20 and has a surface continuous with the surfaces 20a extending axially of the bearing surface 10 and in close-spaced relationship thereto. This conductor has a stack of U-shaped laminations 31 over a substantial portion of its length, the ends of the U-shaped laminations being generally coextensive with the workpiece-facing surface of this conductor 21.

In the embodiment of the invention shown, the circumferential extent of the side conductors 20 relative to the bearing 10 is approximately 45 degrees, although this angular arc may be more or less, dependent upon the particular type of crankshaft to be processed.

High-frequency electric currents are flowed through the conductors of this inductor and, at any one instant, flow in one direction in one of the side conductors 20, thence axially of the bearing 10 in the end conductor 21 and thence in the opposite direction in the other side conductor 20. The currents flowing in the side conductors 20 induce oppositely flowing currents to flow on both sides of the fillets 12; that is, in the cheeks 11 and in bearing surface 10 immediately adjacent to the fillet, which currents, because of the high-frequency nature, tend to cling to the surface only of the crankshaft and effect a heating action faster than the rate of heat flow into the crankshaft by conduction so that, primarily, only the surfaces of the crankshaft adjacent to the fillet are heated to a temperature above the critical temperature.

The end conductor 21, in a like manner, effects a heating action on the portions of the bearing surface 10 intermediate the fillets 12, but the heating action thereof is relatively less than that of the side conductors 20 because the actual length of the end conductor 21 in heat-inducing relationship with the bearing surface 10 is far less than that of the side conductors 20. This is not detrimental, however, because, even with the construction of the inductor shown, there is a tendency for the principal amount of heating of the side conductors 20 to occur in the cylindrical bearing surface 10 rather than in the cheeks 11, some of which heat there induced can thus drift axially of the bearing surface by conduction to increase the over-all heating effect in the central portions of the bearing surface 10. Notwithstanding this tendency, however, the side conductors 20 do effect a very substantial amount of heating in the cheeks 11 radially outwardly of the fillets 12. During this heating action, the crankshaft is continuously rotated about the axis of the bearing surface 10 so that what would normally be considered to be localized heating, immediately under the conductors of the inductor, is distributed or integrated over the entire bearing surface 10 and fillets 12.

The heating action in the fillets 12 and radially outwardly thereof is further facilitated by the fact that the current in the two side conductors 20 at any one instant are flowing in opposite directions which considerably reduces the tendency for the induced currents to crowd into the bearing surface 10.

The heating action takes place primarily in the surfaces of the crankshaft and takes place so rapidly that only the surfaces are heated to a temperature above the critical temperature of the steel employed. Immediately after the bearing surfaces have reached a critical temperature, a quenching fluid is projected against the heated surfaces to harden same. This quenching action may take place in any known or desired manner but, in the embodiment of the invention shown, a quench block 40 has a hollow interior 41 which communicates through a suitable pipe fitting 42 to a source of quench fluid not shown from which quenching fluid under pressure flows into the chamber 41 and thence through a plurality of small orifices 43 in an arcuate workpiece-facing surface 44 of the block 40. This surface 44, as shown, is in close-spaced relationship to the bearing surface 10 and the fillet 12 so that a high-volume, high-velocity quench may be projected against the entire heated surface. During this quenching operation, rotation of the crankshaft is continued so that the entire heated surface of the crankshaft to be hardened is brought under the influences of the quench substantially simultaneously.

It will be noted from Figure 2 that there is generally a greater volume of metal adjacent the fillets 12 to be heated on the side in which the crank cheeks extend and a lesser volume of metal approximately 180 degrees away therefrom. Normally, less heating effect will be required at this last-mentioned point and to compensate for this, it is preferred that some means be provided for varying the heating effect of the inductor as the crankshaft rotates so as to obtain a uniform and desired heat pattern. This may be accomplished by providing means for varying the power input to the inductor as the crankshaft rotates or may be provided by allowing the power input to the inductor to remain generally constant and mounting the crankshaft for rotation about an axis slightly spaced from the axis of the bearing surface 10, thus producing an eccentric rotation of the bearing surface 10 relative to the inductor. This eccentricity should be so adjusted as to provide an increased clearance between the bearing surface 10 and the inductor at the point where the lesser amount of heating is desired. Alternatively, the inductor can be mounted on movable supports so as to be moved relative to the crankshaft as the crankshaft rotates.

Further, preheating of the portion of the bearing surface 10 on the side in which the cheeks extend could be effected by holding the crankshaft stationary relative to the inductor until a desired amount of preheating has been effected and then commencing the rotation of the crankshaft relative to the inductor to effect the final heating to the ultimate temperature. This preheating could also be effected by rocking the crankshaft back and forth relative to the inductor so as to distribute the heating effect of the end conductor 21 on the bearing surface during this preheating operation.

The present invention has enabled the obtaining of heat patterns in the fillets of a crankshaft which have not been obtainable by any other known method of heating or other conventional types of single-turn inductors which completely encircle the bearing and has enabled these results to be obtained using considerably lower power concentrations than have heretofore been necessary.

Having thus described my invention, I claim:

1. In combination, a crankshaft having a cylindrical bearing and a pair of parallel extending webs at the ends of said bearing connecting with the bearing through fillets; a high-frequency inductor for heating said bearing surfaces, the bearing-adjacent surfaces of said webs and the intermediate fillets, including a pair of parallel extending spaced side conductors each having bearing, fillet and web-facing surfaces; said side conductors being interconnected at one end by an end conductor having a bearing-facing surface in heat inducing relationship therewith; the other ends of said side conductors being adapted to be connected to a source of high-frequency electrical power and means for rotating said crankshaft relative to said inductor.

2. The combination of claim 1 wherein means are provided for varying the inducing effect of said inductor as said crankshaft is rotated to provide a uniform heated pattern about said fillets.

3. The combination of claim 2 wherein said means include means for varying the power input to said inductor in relation to the rotative position of said crankshaft.

4. The combination of claim 2 wherein said means comprise means for varying the spacing of said bearing surface relative to said inductor as said crankshaft is rotated.

5. The combination of claim 2 wherein the crankshaft is mounted for rotation about an axis eccentric to the axis of the bearing surface being heated whereby to provide a varying inducing effect on the crankshaft and produce a uniformly heated fillet.

References Cited in the file of this patent

UNITED STATES PATENTS

| 2,213,241 | Denneen et al. | Sept. 3, 1940 |
| 2,419,619 | Wood | Apr. 29, 1947 |
| 2,477,029 | Wood | July 26, 1949 |
| 2,649,527 | Chapman et al. | Aug. 18, 1953 |

FOREIGN PATENTS

| 66,047 | Norway | Apr. 5, 1943 |
| 69,172 | Norway | Apr. 23, 1945 |
| 624,444 | Great Britain | June 8, 1949 |